US012380839B2

(12) United States Patent
Zhou et al.

(10) Patent No.: US 12,380,839 B2
(45) Date of Patent: Aug. 5, 2025

(54) DRIVE CIRCUIT OF PIXEL UNIT, AND DISPLAY PANEL

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/725,748

(22) PCT Filed: Dec. 21, 2022

(86) PCT No.: PCT/CN2022/140822
§ 371 (c)(1),
(2) Date: Jun. 28, 2024

(87) PCT Pub. No.: WO2023/221498
PCT Pub. Date: Nov. 23, 2023

(65) Prior Publication Data

US 2025/0069544 A1 Feb. 27, 2025

(30) Foreign Application Priority Data

May 18, 2022 (CN) ......................... 202210551407.8

(51) Int. Cl.
*G09G 3/32* (2016.01)

(52) U.S. Cl.
CPC ....... *G09G 3/32* (2013.01); *G09G 2300/0852* (2013.01); *G09G 2310/0251* (2013.01);
(Continued)

(58) Field of Classification Search
CPC ............. G09G 3/32; G09G 2300/0852; G09G 2310/0251; G09G 2320/0252; G09G 2320/045; G09G 2330/02; G09G 2330/04
See application file for complete search history.

(56) References Cited

U.S. PATENT DOCUMENTS 9,934,725 B2 * 4/2018 Chaji .................. G09G 3/3233
2004/0090186 A1 5/2004 Yoshida et al.
(Continued)

FOREIGN PATENT DOCUMENTS

CN 1499471 A 5/2004
CN 103596344 A 2/2014
(Continued)

OTHER PUBLICATIONS

International Search Report issued Feb. 22, 2023, on a PCT Application No. PCT/CN2022/140822, filed Dec. 21, 2022. English Translation attached.
(Continued)

*Primary Examiner* — Andrew Sasinowski
(74) *Attorney, Agent, or Firm* — Franklin & Associates International Inc; Matthew F. Lambrinos

(57) ABSTRACT

The present application relates to a drive circuit of a pixel unit, and a display panel. A switch module (300) of the drive circuit controls connection and disconnection between a light-emitting unit (100) and a pre-charging module (500) according to a line scanning signal transmitted by a main control module (200); a triggering module (400) controls connection and disconnection between a power supply unit (600) and the pre-charging module (500), as well as connection and disconnection between a pre-charging power supply unit (700) and the pre-charging module (500) according to the line scanning signal transmitted by the main control module (200) when the light-emitting unit (100) and the pre-charging module (500) are disconnected; and the light-emitting unit (100) performs, when the light-emitting unit (100) and the pre-charging module (500) are connected, luminescence display under control of a power supply voltage transmitted by the power supply unit (600) through the pre-charging module (500) and a pre-charging voltage
(Continued)

generated when the pre-charging module (500) is connected to the pre-charging power supply unit (700).

18 Claims, 3 Drawing Sheets

(52) U.S. Cl.
CPC ............... *G09G 2320/0252* (2013.01); *G09G 2320/045* (2013.01); *G09G 2330/02* (2013.01); *G09G 2330/04* (2013.01)

(56) References Cited

U.S. PATENT DOCUMENTS

| | | | | |
|---|---|---|---|---|
| 2015/0293546 | A1* | 10/2015 | Tanaka | G02F 1/13454 327/541 |
| 2015/0339974 | A1* | 11/2015 | Wu | G09G 3/3233 345/82 |
| 2018/0286313 | A1 | 10/2018 | Zheng | |
| 2020/0160807 | A1* | 5/2020 | Tomie | G09G 3/3677 |
| 2022/0358894 | A1* | 11/2022 | Wang | G06F 9/451 |
| 2023/0018416 | A1 | 1/2023 | Davenport et al. | |

FOREIGN PATENT DOCUMENTS

| | | | |
|---|---|---|---|
| CN | 106297667 | A | 1/2017 |
| CN | 106782310 | A | 5/2017 |
| CN | 110189705 | A | 2/2021 |
| CN | 113362765 | A | 9/2021 |
| CN | 113487996 | A | 10/2021 |
| CN | 214541526 | U | 10/2021 |
| CN | 115206227 | A | 10/2022 |
| JP | 2020013074 | A | 1/2020 |

OTHER PUBLICATIONS

Written Opinion issued Feb. 22, 2023, on a PCT Application No. PCT/CN2022/140822, filed Dec. 21, 2022. English Translation attached.

* cited by examiner

DRIVE CIRCUIT OF PIXEL UNIT, AND DISPLAY PANEL

CROSS-REFERENCE TO RELATED APPLICATIONS

The present application is a 371 national phase of International Patent Application No. PCT/CN2022/140822, filed Dec. 21, 2022, which claims priority to Chinese Patent Application No. 202210551407.8, filed to CNIPA on May 18, 2022, and entitled "Drive Circuit of Pixel Unit, and Display Panel", the entire content of which is incorporated herein by reference.

TECHNICAL FIELD

The present application relates to the technical field of displaying, in particular to a drive circuit of a pixel unit, and a display panel.

BACKGROUND

In the related art, Light-Emitting Diode (LED) displaying has been widely used in various fields due to its advantages, such as low voltage, energy conservation, and long service life.

In the related art, when a light-emitting device (such as a micro-LED) in a display panel is turned off, the light-emitting device maintains a certain connection with a corresponding power supply unit and is not completely disconnected. As a result, the light-emitting device of the display panel is easily damaged, and the display life of the display panel is short. At the same time, in the related art, the operation of turning on the light-emitting device again after the light-emitting device of the display panel is turned off is not sensitive, which affects a display effect.

There is no effective solution to the problem of the short display life of the display panel in the related art.

SUMMARY

The present application provides a drive circuit of a pixel unit, and a display panel, so as to at least solve the problem of a short service life of a display panel in the related art.

In one aspect, the present application provides a drive circuit of a pixel unit, which is configured to drive a light-emitting unit of the pixel unit. The drive circuit includes a main control module, a switch module, a triggering module, a pre-charging module, a power supply unit, and a pre-charging power supply unit; the main control module is electrically connected to the switch module and the triggering module respectively, and transmits a line scanning signal to the switch module and the triggering module; the switch module is also electrically connected to the light-emitting unit and the pre-charging module respectively; the triggering module is also electrically connected to the pre-charging module; the pre-charging module is also electrically connected to the power supply unit and the pre-charging power supply unit respectively; the switch module is configured to control connection and disconnection between the light-emitting unit and the pre-charging module according to the received line scanning signal; the triggering module is configured to control connection and disconnection between the power supply unit and the pre-charging module, as well as connection and disconnection between the pre-charging power supply unit and the pre-charging module according to the received line scanning signal when the light-emitting unit and the pre-charging module are disconnected; and the light-emitting unit is configured to perform, when the light-emitting unit and the pre-charging module are connected, luminescence display under control of a power supply voltage transmitted by the power supply unit through the pre-charging module, and perform luminescence display under control of a pre-charging voltage generated when the pre-charging module is connected to the pre-charging power supply unit.

In the other aspect, the present application provides a display panel, including a plurality of pixel units. Each pixel unit includes a light-emitting unit and a drive circuit for driving the light-emitting unit. The drive circuit includes the drive circuit in the first aspect.

Compared with the related art, the present application provides the drive circuit of the pixel unit, and the display panel. The drive circuit includes the main control module, the switch module, the triggering module, the pre-charging module, the power supply unit, and the pre-charging power supply unit; the main control module transmits the line scanning signal to the switch module and the triggering module; the switch module controls connection and disconnection between the light-emitting unit and the pre-charging module according to the received line scanning signal; the triggering module controls connection and disconnection between the power supply unit and the pre-charging module, as well as connection and disconnection between the pre-charging power supply unit and the pre-charging module according to the received line scanning signal when the light-emitting unit and the pre-charging module are disconnected; and the light-emitting unit performs, when the light-emitting unit and the pre-charging module are connected, luminescence display under control of the power supply voltage transmitted by the power supply unit through the pre-charging module, and performs luminescence display under control of the pre-charging voltage when the pre-charging module is connected to the pre-charging power supply unit. Thus, when the light-emitting unit is turned off, the light-emitting unit is completely disconnected from the power supply unit, so that the problem of short life of display of the display panel in the related art is solved. In a turn-off control process of the light-emitting unit, the light-emitting unit is disconnected from the power supply unit and is pre-charged, so as to achieve effects of protecting the light-emitting unit, increasing the reaction speed of the luminescence display of the light-emitting unit, and improving the display reaction sensitivity and the display effect.

The details of one or more embodiments of the present application are presented in the following drawings and descriptions to make other features, objectives, and advantages of the present application more concise and understandable.

BRIEF DESCRIPTION OF THE DRAWINGS

The accompanying drawings, which are incorporated in and constitute a part of this specification, illustrate embodiments consistent with the present application and, together with the specification, serve to explain the principles of the present application.

In order to more clearly illustrate the embodiments of the present application or the technical solutions in the prior art, the accompanying drawings that are required to be used in the description of the embodiments or the prior art will be briefly introduced below. Apparently, those of ordinary skill in the art can also obtain other drawings according to these drawings without creative work.

DETAILED DESCRIPTION

In order to make the objectives, technical solutions and advantages of the embodiments of the present application clearer, the technical solutions in the embodiments of the present application will be described clearly and completely below in combination with the drawings in the embodiments of the present application. Apparently, the embodiments described are part of the embodiments of the present application, not all the embodiments. Based on the embodiments in the present application, all other embodiments obtained by those of ordinary skill in the art without creative work all fall within the protection scope of the present application.

The technical solutions in the embodiments of the present application will be described below in combination with the accompanying drawings in the embodiments of the present application.

Figure 1:
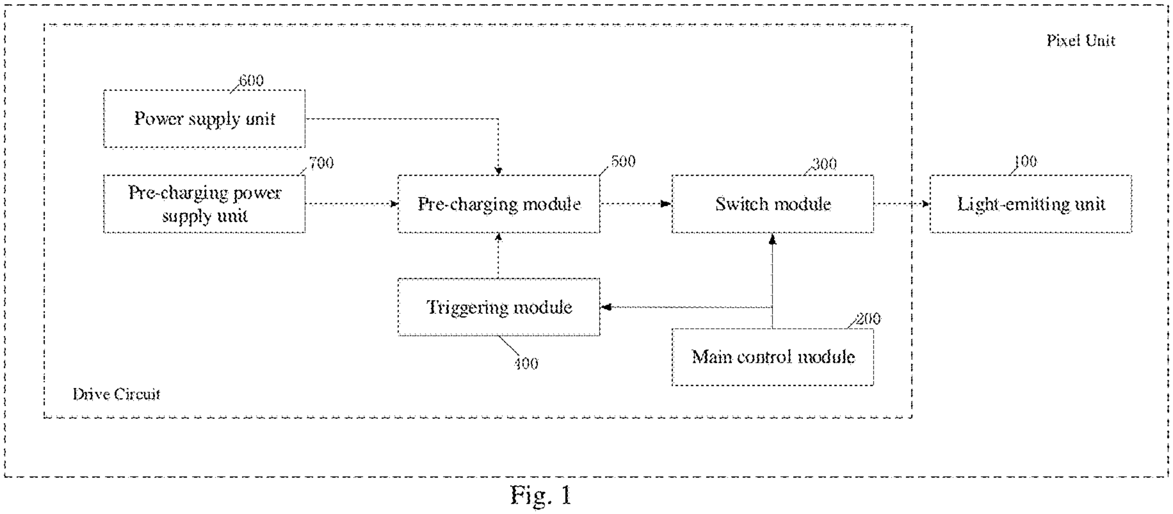
FIG. 1 is a logical block diagram of a drive circuit of a pixel unit according to an embodiment of the present application.
Figure 7:
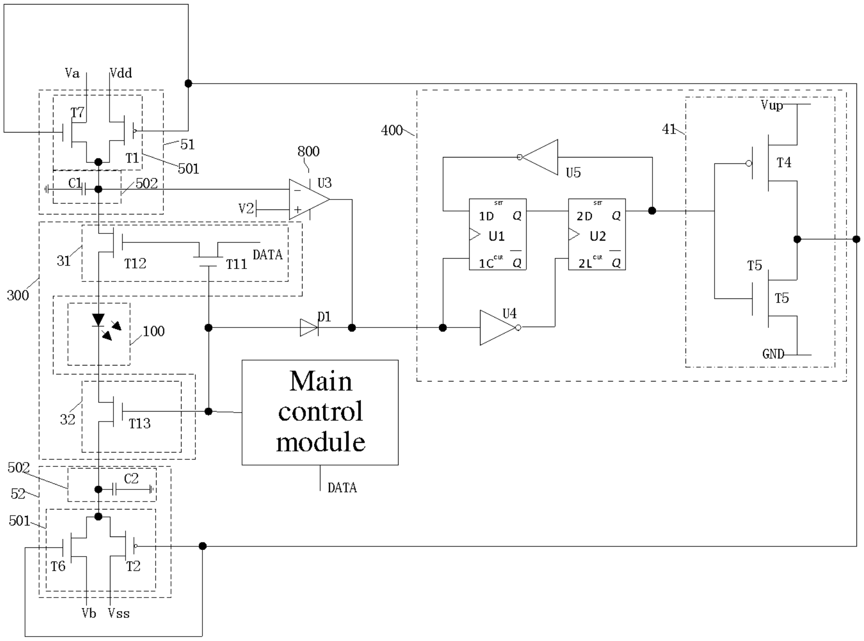
FIG. 7 is a topological diagram of a drive circuit of a pixel unit according to an embodiment of the present application.

FIG. 1 is a logical block diagram of a drive circuit of a pixel unit according to an embodiment of the present application, and FIG. 7 is a topological diagram of a drive circuit of a pixel unit according to an embodiment of the present application. The drive circuit of the pixel unit shown in FIG. 1 and FIG. 7 is used for driving a light-emitting unit 100 of the pixel unit to emit light.

Referring to FIG. 1 and FIG. 7, the drive circuit of the pixel unit provided in this embodiment of the present application includes a light-emitting unit 100. The light-emitting unit 100 may be a micro light-emitting diode (Micro-LED), but is not limited to the Micro-LED. The drive circuit includes a main control module 200, a switch module 300, a triggering module 400, a pre-charging module 500, a power supply unit 600, and a pre-charging power supply unit 700. The main control module 200 is electrically connected to the switch module 300 and the triggering module 400 respectively. The main control module 200 may transmit a line scanning signal to the switch module 300 and the triggering module 400. The switch module 300 is also electrically connected to the light-emitting unit 100 and the pre-charging module 500 respectively. The triggering module 400 is also electrically connected to the pre-charging module 500. The pre-charging module 500 is also electrically connected to the power supply unit 600 and the pre-charging power supply unit 700 respectively. The switch module 200 may receive the line scanning signal transmitted by the main control module 200, and the switch module 200 may control on and off of a circuit between the light-emitting unit 100 and the pre-charging module 500 according to the received line scanning signal.

When the light-emitting unit 100 is disconnected from the pre-charging module 500, the triggering module 400 controls on and off of a circuit between the power supply unit 600 and the pre-charging module 500 according to the received line scanning signal, and the triggering module 400 controls on and off of a circuit between the pre-charging power supply unit 700 and the pre-charging module 500 according to the received line scanning signal.

When the light-emitting unit 100 is connected to the pre-charging module 500, the light-emitting unit 100 is controlled to perform luminescence display by the power supply unit 600 through a power supply voltage transmitted by the pre-charging module 500, and the light-emitting unit 100 is controlled to perform luminescence display by a pre-charging voltage generated when the pre-charging module 500 is connected to the pre-charging power supply unit 700.

In this embodiment, the power supply voltage is made to one end of the light-emitting unit 100, and the pre-charging voltage is made to the other end of the light-emitting unit 100. When a voltage difference between the power supply voltage and the pre-charging voltage is greater than a rated turn-on voltage of the light-emitting unit 100, that is, in case of a transistor voltage drop, the light-emitting unit 100 performs the luminescence display.

In this embodiment, the main control module 200 includes a microcontroller. The microcontroller includes but is not limited to one of the following: a single-chip microcomputer, a Digital Signal Processor (DSP), and a Field-Programmable Gate Array (FPGA).

In this embodiment, a line scanning port of the main control module 200 is electrically connected to a control port of the switch module 300. An input end of the pre-charging module 500 is electrically connected to the power supply unit 600 and the pre-charging power supply unit 700. An input end of the switch module 200 is connected to an output end of the pre-charging module 500, and an output end of the switch module 300 is connected to the light-emitting unit 100.

In order to form a complete circuit, the light-emitting unit 100 is completely disconnected from a corresponding power supply when the light-emitting unit 100 is controlled to be turned off. The switch module 300 in this embodiment includes a first switch unit 31 and a second switch unit 32. The pre-charging module 500 includes a first pre-charging unit 51 and a second pre-charging unit 52.

A first input port of the first pre-charging unit 51 is electrically connected to a positive power end (refer to Vdd in FIG. 3) of the power supply unit 600, and a second input port of the first pre-charging unit 51 is electrically connected to a voltage port (refer to Va in FIG. 3) of the pre-charging power supply unit 700; and an output end of the first pre-charging unit 51 is electrically connected to an input end of the first switch unit 31.

An output end of the first switch unit 31 is electrically connected to a first end of the light-emitting unit 100.

A second end of the light-emitting unit 100 is electrically connected to an input end of the second switch unit 32.

An output end of the second switch unit 32 is electrically connected to an output end of the second pre-charging unit 52.

A first input port of the second pre-charging unit 52 is connected to a negative power end (for example: a negative electrode of a power supply, or the ground) of the power supply unit 600, and a second input port of the second pre-charging unit 52 is connected to the other voltage port (refer to Vb in FIG. 3) of the pre-charging power supply unit 700. A voltage provided by the other voltage port is not the voltage required by the light-emitting unit 100 for the luminescence display.

In this embodiment, when the main control module 200 controls the switch module 300, the first switch unit 31 and the second switch unit 32 are simultaneously controlled, thereby connecting or disconnecting two ends of the light-emitting unit 100 to or from the corresponding pre-charging units.

In this embodiment, the light-emitting unit 100 is the smallest pixel unit of a display panel. The light-emitting unit 100 may be a Micro-LED. An anode of the Micro-LED corresponds to the first end of the light-emitting unit 100, and a cathode of the Micro-LED corresponds to the second end of the light-emitting unit 100.

In this embodiment, the power supply unit 600 supplies power to the light-emitting unit 100. In this embodiment, the power supply unit 600 supplies a direct-current (DC) voltage (for example, a voltage value of the DC voltage may be 5 V, 3.3 V, or 1.8 V) to the light-emitting unit 100. After the light-emitting unit 100 is turned off at current time and before the light-emitting unit performs luminescence display at next time, the pre-charging power supply unit 700 may provide in advance stored energy with a set voltage value for the light-emitting unit 100 for luminescence display by providing a corresponding voltage and being pre-charged through the corresponding charging element of the pre-charging module 500, so that the light-emitting unit 100 can quickly make a response during next displaying, and the influence caused by slow response of display on the display effect is avoided.

In this embodiment, the pre-charging power supply unit 700 and the power supply unit 600 may use the same power module or different power modules. When the same power module is used, the pre-charging power supply unit 700 and the power supply unit 600 respectively correspond to different voltage output ports of the power module. A voltage value of an output voltage of a voltage output port corresponding to the pre-charging power supply unit 700 is set to be less than a voltage value of the power supply voltage of the power supply unit 600.

In this embodiment, a line scanning signal port of the main control module 200 is connected to an input end of the triggering module 400. In this embodiment, triggering of the triggering module 400 mainly considers relevant control during the turn-off process of the light-emitting unit 100, that is, control during a stage where the line scanning signal is changed from a high level to a low level and does not return to the high level. However, after the line scanning signal is changed into the high level, the light-emitting unit 100 has already emitted light and a relevant triggering mechanism does not exist. Therefore, after the line scanning signal is changed into the high level, it is default that the light-emitting unit 100 has completed the luminescence display.

In some implementations, the triggering module 400 is triggered using a falling edge of the line scanning signal, which means that when the line scanning signal is changed from the high level to the low level, the triggering module 400 will be triggered and activated, to correspondingly generate relevant control signals that control on and off of the circuit between the power supply unit 600 and the pre-charging module 500 and control on and off of the circuit between the pre-charging power supply unit 700 and the pre-charging module 500.

In this embodiment, when the triggering module 400 is activated, the switch module 300 controls the two ends of the light-emitting unit 100 to be disconnected from the pre-charging module 500 due to a low level of the line scanning signal received by the switch module 300, thereby cutting off the connection to the power supply.

In this embodiment, the main control module 200, the switch module 300, the triggering module 400, the pre-charging module 500, the power supply unit 600, and the pre-charging power supply unit 700 are arranged, and the line scanning signal is transmitted to the switch module 300 and the triggering module 400 through the main control module 200, so that the switch module 300 controls on and off of the circuit between the light-emitting unit 100 and the pre-charging module 500 according to the received line scanning signal, achieving isolation between the light-emitting unit 100 and the power supply, that is, the power input to the input light-emitting unit 100 is cut off. When the light-emitting unit 100 is disconnected from the pre-charging module 500, the triggering module 400 controls on and off of the circuit between the power supply unit 600 and the pre-charging module 500 according to the received line scanning signal, and the triggering module 400 controls on and off of the circuit between the pre-charging power supply unit 700 and the pre-charging module 500 according to the received line scanning signal, achieving the isolation between the light-emitting unit 100 and the power supply while providing the stored energy for next light emission of the light-emitting unit 100. When the light-emitting unit 100 is connected to the pre-charging module 500, the light-emitting unit 100 performs the luminescence display under control of the power supply voltage transmitted by the power supply unit 600 through the pre-charging module 500, and performs the luminescence display under control of the pre-charging voltage generated when the pre-charging module 500 is connected to the pre-charging power supply unit 700.

In this embodiment, the light-emitting unit 100 quickly makes a light-emitting response, which solves the problems of short life of display and insensitive response of display of a display panel in the related art, thereby achieving beneficial effects of protecting the light-emitting unit 100, increasing the response speed of the luminescence display of the light-emitting unit 100, and improving the display response sensitivity and the display effect.

Figure 2:
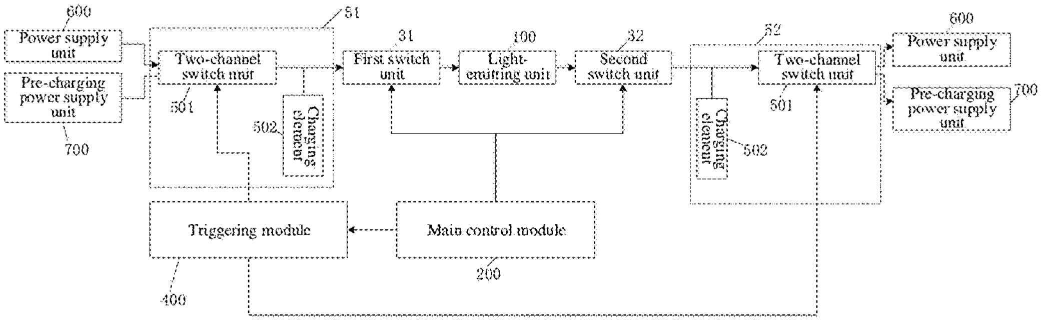
FIG. 2 is a logical block diagram I of a drive circuit of a pixel unit according to a preferred embodiment of the present application.
Figure 3:
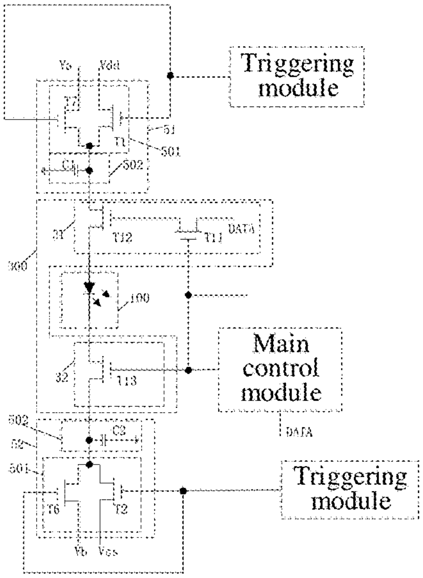
FIG. 3 is a topological diagram of a pre-charging module, a switch module, and a light-emitting unit according to an embodiment of the present application.

FIG. 2 is a logical block diagram I of a drive circuit of a pixel unit according to a preferred embodiment of the present application, and FIG. 3 is a topological diagram of a pre-charging module, a switch module, and a light-emitting unit according to an embodiment of the present application. To achieve isolation from the power supply and pre-charging when the light-emitting unit 100 is turned off, referring to FIG. 1 to FIG. 3 and FIG. 7, in some implementations, the pre-charging module 500 includes a first pre-charging unit 51 and a second pre-charging unit 52. The first pre-charging unit 51 includes a two-channel switch unit 501 and a charging element 502, and the second pre-charging unit 52 also includes a two-channel switch unit 501 and a charging element 502.

A first input end of the two-channel switch unit 501 of the first pre-charging unit 51 is electrically connected to a positive power port (refer to Vdd in FIG. 3 and FIG. 7) of the power supply unit 600, and a second input end of the two-channel switch unit 501 of the first pre-charging unit 51 is electrically connected to a first port (refer to Va in FIG. 7) of the pre-charging power supply unit 700. A first input end of the two-channel switch unit 501 of the second pre-charging unit 52 is electrically connected to a negative power port (refer to Vss in FIG. 3 and FIG. 7, in practice, the negative power port may be a common ground GND) of the power supply unit 600, and a second input end of the two-channel switch unit 501 of the second pre-charging unit 52 is electrically connected to a second port (refer to Vb in FIG. 3 and FIG. 7, a voltage of the second port cannot be a voltage for enabling the light-emitting unit 100 to emit light) of the pre-charging power supply unit 700. An output end of the triggering module 400 is electrically connected to a first controlled end and a second controlled end of the two-channel switch unit 501 of the first pre-charging unit 51, and the output end of the triggering module 400 is also electrically connected to a first controlled end and a second controlled end of the two-channel switch unit 501 of the second pre-charging unit 52. Electrical connection points of a first output end and a second output end of the two-channel switch unit 501 of the first pre-charging unit 51 are electrically connected to electrical connection points of the charging element 502 (refer to C1 in FIG. 3 and FIG. 7) and the switch module 300. Electrical connection points of a first output end and a second output end of the two-channel switch unit 501 of the second pre-charging unit 52 are electrically connected to electrical connection points of the charging element 502 (refer to C2 in FIG. 3 and FIG. 7) and the switch module 300. The charging element 502 is grounded away from the end electrically connected to the switch module 300.

When the light-emitting unit 100 is disconnected from the pre-charging module 500, the triggering module 400 generates, according to the received line scanning signal, a triggering signal that controls the two-channel switch unit 501.

The two-channel switch unit 501 may control, according to the triggering signal output by the triggering module 400, the switch module 300 to be connected to one of the power supply units 600 and the pre-charging power supply unit 700.

The charging element 502 may perform pre-charging on the basis of the pre-charging voltage provided by the pre-charging power supply unit 700.

When the switch module 300 is connected to the pre-charging power supply unit 700 and the switch module 300 disconnects the pre-charging module 500 from the light-emitting unit 100, the pre-charging module 500 controls the charging element 502 for pre-charging, and when the switch module 300 connects the pre-charging module 500 to the light-emitting unit 100, the pre-charging module 500 controls the power supply unit 600 to be connected to the light-emitting unit 100.

In this embodiment, the triggering module 400 is triggered using a falling edge of the line scanning signal. When the two-channel switch units 501 receives the corresponding triggering signal, the switch module 300 is controlled to be disconnected from the power supply unit 600 and be connected to the pre-charging power supply unit 700, or the switch module 300 is controlled to be disconnected from the pre-charging power supply unit 700 and be connected to the power supply unit 600.

In this embodiment, when the pre-charging voltage of the charging element 502 (the charging element 502 corresponding to the first pre-charging unit 51) reaches a preset threshold, the pre-charging will be stopped, and the voltage is stabilized through the charging element 502.

In this embodiment, when the line scanning signal is changed from a preset low level to a high level, the switch module 300 will connect the pre-charging module 500 to the light-emitting unit 100. At this time, due to the pre-charging of the charging element 502, the light-emitting unit 100 is powered to emit light by the power supply voltage (refer to Vdd in FIG. 3 and FIG. 7) and the pre-charging voltage (refer to Va in FIG. 3 and FIG. 7) provided by the power supply unit 600, and the light-emitting unit 100 makes a fast response to light emission.

In some implementations, in order to achieve the isolation between the switch module 300 and the power supply unit 600 by the pre-charging module 500 and to achieve the pre-charging, referring to FIG. 3 and FIG. 7, the two-channel switch unit 501 includes a first switch transistor (refer to T1 and T2 in FIG. 2) and a second switch transistor (refer to T6 and T7 in FIG. 3 and FIG. 7). An input end of the first switch transistor is abutted with the first input end, and an input end of the second switch transistor is abutted with the second input end. A control end of the first switch transistor is abutted with the first controlled end; a control end of the second switch transistor is abutted with the second controlled end; an output end of the first switch transistor is abutted with the first output end; and an output end of the second switch transistor is abutted with the second output end.

The first switch transistor is configured to control, when a level of the triggering signal received by the control end of the first switch transistor is a preset low level, the input end and output end of the first switch transistor to be switched on, and control, when a level of the triggering signal received by the control end of the first switch transistor is a preset high level, the input end and output end of the first switch transistor to be switched off.

The second switch transistor is configured to control, when a level of the triggering signal received by the control end of the first switch transistor is a preset low level, the input end and output end of the second switch transistor to be switched off, and control, when a level of the triggering signal received by the control end of the first switch transistor is a preset high level, the input end and output end of the second switch transistor to be switched on.

When the input end and output end of the first switch transistor are switched on and the input end and output end of the second switch transistor are switched off, the two-channel switch unit 501 controls the pre-charging power supply unit 700 to be connected to the switch module 300, and when the input end and output end of the first switch transistor are switched off and the input end and output end of the second switch transistor are switched on, the two-channel switch unit 501 controls the power supply unit 600 to be connected to the switch module 300.

In this embodiment, on or off of the input ends and output ends of the first switch transistors corresponding to the first pre-charging unit 51 and the second pre-charging unit 52 is synchronously controlled. That is, when the input end and output end of the first switch transistor of the first pre-charging unit 51 are switched on, the input end and output end of the first switch transistor of the second pre-charging unit 52 are also switched on. It is in the same way for switching off. At the same time, on or off of the input ends and output ends of the second switch transistors corresponding to the first pre-charging unit 51 and the second pre-charging unit 52 is also synchronously controlled. The switch transistors corresponding to the first pre-charging unit 51 and the second pre-charging unit 52 are switched on or switched off to switch on or switch off circuits of corresponding channels. For example, when the input ends and output ends of the first switch transistors corresponding to the first pre-charging unit 51 and the second pre-charging unit 52 are switched on, a corresponding circuit is correspondingly formed by the power supply unit 600 and the light-emitting unit 100, and the light-emitting unit 100 performs luminescence display.

The first switch transistor and the second switch transistor in this embodiment of the present application include but are not limited to triodes, MOS transistors, and thin film transistors. Moreover, according to the content disclosed in the present application, it is easy for those skilled in the art to contemplate modifying, according to a specific selected type of a switch transistor, the two-channel switch unit 501 disclosed in the present application into a two-channel switch unit adapting to the selected type of the switch transistor. Therefore, the present application can be achieved by an NPN or PNP-type triode, an N-channel or P-channel switch MOS transistor, or an N-type or P-type thin film transistor. It is not limited in this embodiment of the present application.

In some implementations, the first switch transistor is a P-type switch transistor, for example: a P-type MOS transistor or P-type thin film transistor, and the second switch transistor is an N-type switch transistor, for example: an N-type MOS transistor or N-type thin film transistor.

In some implementations, the charging elements include capacitors (refer to C1 and C2 in FIG. 2).

Figure 4:
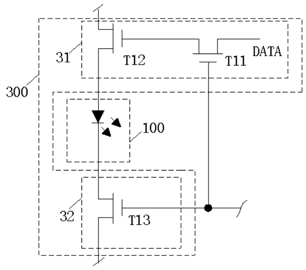
FIG. 4 is a topological diagram of a switch module and a light-emitting unit according to an embodiment of the present application.

FIG. 4 is a topological diagram of a switch module and a light-emitting unit according to an embodiment of the present application. In order to achieve control of on and off between two ends of the light-emitting unit and corresponding power supplies to achieve turning on or turning off of the light-emitting unit, referring to FIG. 1 to FIG. 4 and FIG. 7, in some implementations, the switch module 300 includes a first switch unit 31 and a second switch unit 32. The first switch unit 31 includes a third input end (refer to electrical connection points between a switch transistor T12 and a switch transistor T1, a switch transistor T7, as well as the capacitor C1 in FIG. 3 to FIG. 4 and FIG. 7), a third output end (refer to an electrical connection point between the switch transistor T12 and the light-emitting unit 100 in FIG. 3 to FIG. 4 and FIG. 7), and a third control end (refer to an electrical connection point between a switch transistor T11 and the main control module in FIG. 3 to FIG. 4 and FIG. 7). The third input end is electrically connected to the first output end and the second output end of the two-channel switch unit 501 of the first pre-charging unit 51; the third output end is electrically connected to the first end of the light-emitting unit 100; and the third control end is electrically connected to the line scanning signal port of the main control module 200.

The second switch unit 32 includes a fourth input end (refer to electrical connection points between a switch transistor T13 and a switch transistor T2, a switch transistor T6, as well as the capacitor C2 in FIG. 3 to FIG. 4 and FIG. 7), a fourth output end (refer to an electrical connection point between the switch transistor T13 and the light-emitting unit 100 in FIG. 3 to FIG. 4 and FIG. 7), and a fourth control end (refer to an electrical connection point between the switch transistor T13 and the main control module in FIG. 3 to FIG. 4 and FIG. 7). The fourth input end is electrically connected to the second end of the light-emitting unit 100; the fourth output end is electrically connected to the first output end and the second output end of the two-channel switch unit 501 of the second pre-charging unit 52; and the fourth control end is also electrically connected to the line scanning signal port of the main control module 200.

The first switch unit 31 is configured to control on and off of the third input end and the third output end according to the line scanning signal received by the third control end.

In this embodiment, the main control module 200 outputs a corresponding line scanning signal (corresponding to low and high levels, where a high level is represented by “1” and a low level is represented by “0”) along the line scanning signal port thereof. When a control signal received by the third control end is at a high level, the first switch unit 31 correspondingly controls the third input end and the third output end to be switched on, that is, controls the first end to be connected to the first pre-charging unit 51. When the line scanning signal received by the third control end is at a low level, the first switch unit 41 correspondingly controls the third input end and the third output end to be switched off, that is, controls the first end to be disconnected from the first pre-charging unit 51.

The second switch unit 32 is configured to control on and off of the fourth input end and the fourth output end according to the line scanning signal received by the fourth control end.

In this embodiment, the line scanning signal received by the fourth control end is the same as the line scanning signal received by the third control end, that is, when the line scanning signal received by the third control end is at the high level, the fourth control end also receives a high-level line scanning signal. The second switch unit 32 correspondingly controls the fourth input end and the fourth output end to be switched on, that is, controls the second end to be connected to the negative power supply (refer to Vss in FIG. 3 to FIG. 4 and FIG. 7). When the line scanning signal received by the third control end is at the low level, the fourth control end also receives a low-level line scanning signal. The second switch unit 32 correspondingly controls the fourth input end and the fourth output end to be switched off, that is, controls the second end to be disconnected from the corresponding negative power supply.

When the third input end and the third output end are switched on, and the fourth input end and the fourth output end are switched on, the switch module 300 controls the light-emitting unit 100 to be connected to the pre-charging module 500. When the third input end and the third output end are switched off, and the fourth input end and the fourth output end are switched off, the switch module 300 controls the light-emitting unit 100 to be disconnected from the pre-charging module 500.

In order to further achieve the control of on and off between the two ends of the light-emitting unit and the corresponding power supplies to achieve turning on or turning off of the light-emitting unit 100, referring to FIG. 1 to FIG. 4 and FIG. 7, in some implementations, the first switch unit 31 includes a first controlled switch (refer to the switch transistor T11 in FIG. 3, FIG. 4, and FIG. 7) and a second controlled switch (refer to the switch transistor T12 in FIG. 3, FIG. 4, and FIG. 7). The second switch unit 32 includes a third controlled switch (refer to the switch transistor T13 in FIG. 3, FIG. 4, and FIG. 7). A controlled end of the first controlled switch is connected to the third control end. An input end of the first controlled switch is electrically connected to a first data port (refer to a net label DATA in FIG. 7) of the main control module 200. An output end of the first controlled switch is electrically connected to a controlled end of the second controlled switch. An input end of the second controlled switch is abutted with the third input end. An output end of the second controlled switch is abutted with the third output end. A controlled end of the third controlled switch is abutted with the fourth control end. An input end of the third controlled switch is abutted with the fourth input end. An output end of the third controlled switch is abutted with the fourth output end.

The first controlled switch is configured to control on and off of the input end and the output end of the first controlled switch according to the line scanning signal received by the controlled end of the first controlled switch.

In this embodiment, the main control module 200 outputs corresponding line scanning signal (corresponding to low and high levels, where a high level is represented by "1" and a low level is represented by "0") along the line scanning signal port thereof. When the line scanning signal received by the controlled end of the first controlled switch is at the high level, the input end of the first controlled switch is connected to the output end. When the line scanning signal received by the controlled end of the first controlled switch is at the low level, the input end and the output end of the first controlled switch are switched off.

The second controlled switch is configured to control, when the input end and the output end of the first controlled switch are switched on, the input end and the output end of the second controlled switch to be switched on, and control, when the input end and the output end of the first controlled switch are switched off, the input end and the output end of the second controlled switch to be switched off.

The third controlled switch is configured to control on and off of the input end and the output end of the third controlled switch according to the line scanning signal received by the controlled end of the third controlled switch.

In this embodiment, the line scanning signal received by the controlled end of the third controlled switch is the same as the line scanning signal received by the controlled end of the first controlled switch. That is, when the line scanning signal received by the controlled end of the first controlled switch is at a high level, the controlled end of the third controlled switch also receives a high-level line scanning signal. The third controlled switch correspondingly controls the input end and the output end thereof to be switched on, so that the second end is connected to a negative power supply or ground. When the line scanning signal received by the controlled end of the first controlled switch is at a low level, the controlled end of the third controlled switch also receives a low-level control signal. The third controlled switch correspondingly controls the input end and the output end thereof to be switched off, so that the second end is disconnected from the negative power supply or ground.

In this embodiment of the present application, the first controlled switch, the second controlled switch, and the third controlled switch are all switch transistors. In this embodiment, the switch transistors include but are not limited to triodes, MOS transistors, and thin film transistors. Moreover, according to the content disclosed in the present application, it is easy for those skilled in the art to contemplate modifying, according to a specific selected type of a switch transistor, the first controlled switch T, the second controlled switch, and the third controlled switch disclosed in the present application into controlled switches adapting to the selected type of the switch transistor. Therefore, the present application can be achieved by an NPN or PNP-type triode, an N-channel or P-channel switch MOS transistor, or an N-type or P-type thin film transistor. It is not limited in this embodiment of the present application.

In some implementations, the first controlled switch, the second controlled switch, and the third controlled switch are all N-type switch transistors, for example: N-type thin film transistors.

Figure 5:
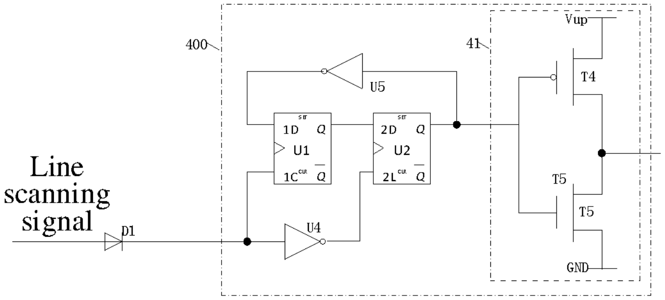
FIG. 5 is a topological diagram of a triggering module according to an embodiment of the present application.

FIG. 5 is a topological diagram of a triggering module according to an embodiment of the present application. In order to provide the pre-charging voltage for the light-emitting unit 100, in some implementations, referring to FIG. 1 to FIG. 2, FIG. 5, and FIG. 7, the triggering module 400 includes a first trigger U1, a second trigger U2, an inverter (as shown in FIG. 5 and FIG. 7, where U4 and U5 are inverters), and a CMOS reverse unit 41. The first trigger U1 includes a first setting port (refer to 1D in FIG. 5 and FIG. 7), a first resetting port (refer to 1C in FIG. 5 and FIG. 7), and a first state output port. The second trigger U2 includes a second setting port (refer to 2D in FIG. 5 and FIG. 7), a second resetting port (refer to 2C in FIG. 2), and a second state output port. The first resetting port is abutted with an input end of the triggering module 400 and is electrically connected to the line scanning signal port. The first resetting port is also electrically connected to the second resetting port through one inverter (refer to U4 in FIG. 5 and FIG. 7). The first state output port is electrically connected to the second setting port. The second state output port is electrically connected to an input end of the CMOS reverse unit 41 and is electrically connected to the first setting port through one inverter (refer to U5 in FIG. 5 and FIG. 7). An output end of the CMOS reverse unit 41 is abutted with an output end of the triggering module 400.

The first trigger U1 is configured to output, when a level of the line scanning signal received by the first resetting port is changed into a preset low level, the level at the first setting port before change of the level of the line scanning signal as a first state signal along the first state output port, and output, when the level of the line scanning signal received by the first resetting port is changed into a preset high level, the level at the first setting port as a first state signal along the first state output port.

The second trigger U2 is configured to output, when a level of the line scanning signal received by the second resetting port is changed into a preset low level, the first state signal received by the second setting port before change of the level of the line scanning signal as a second state signal along the second state output port, and output, when the level of the line scanning signal received by the second resetting port is changed into a preset high level, the first state signal received by the second setting port as a second state signal along the second state output port.

The CMOS reverse unit 41 is configured to reverse the second state signal to generate an enable signal controlling on and off of a circuit between the power supply unit 600 and the pre-charging module 500, as well as an enable signal controlling on and off of a circuit between the pre-charging power supply unit 700 and the pre-charging module 500.

In this embodiment, both the first trigger U1 and the second trigger U2 are D-type latches. When the line scanning signal jumps from a high level to a low level, an output of the first state output port of the first trigger U1 maintains a state of the first setting port at a moment before arrival of the falling edge of the line scanning signal, and thereafter will not be change with the state of the first setting port. After the line scanning signal passes through the inverter U4, the line scanning signal received by the second resetting port of the second trigger U2 is changed into a high level, ensuring that an output of the second state output port of the second trigger U2 remains the same as an input of the second setting port. Since the second setting port of the second trigger U2 is the output of the first state output port of the first trigger U1, the output of the second state output port of the second trigger U2 has the state the same as the state of the first setting port at the moment before the arrival of the falling edge of the line scanning signal.

In some implementations, in order to further provide the pre-charging voltage for the light-emitting unit 100, referring to FIG. 2, FIG. 5, and FIG. 7, both the first trigger U1 and the second trigger U2 include a falling edge trigger. The CMOS reverse unit 41 includes a third switch transistor T4 and a fourth switch transistor T5. Controlled ends of the third switch transistor T4 and the fourth switch transistor T5 are connected to the second state output port. An input end of the third switch transistor T4 is electrically connected to a first power supply (refer to Vup in FIG. 5 and FIG. 7). An output end of the third switch transistor T4 is electrically connected to an input end of the fourth switch transistor T5 and the output end of the triggering module 400 respectively, and an output end of the fourth switch transistor T5 is grounded.

The third switch transistor T4 is configured to control, when the second state signal received by the controlled end of the third switch transistor is at a preset low level, the input end and output end of the third switch transistor to be switched on, and control, when the second state signal received by the controlled end of the third switch transistor is at a preset high level, the input end and output end of the third switch transistor to be switched off.

The fourth switch transistor T5 is configured to control, when the second state signal received by the controlled end of the fourth switch transistor is at a preset low level, the input end and output end of the fourth switch transistor to be switched off, and control, when the second state signal received by the controlled end of the fourth switch transistor is at a preset high level, the input end and output end of the third switch transistor to be switched on.

The CMOS reverse unit 41 is configured to convert the second state signal at the preset low level into an enable signal at the preset high level when the input end and output end of the third switch transistor T4 are switched on and the input end and output end of the fourth switch transistor T5 are switched off, and convert the second state signal at the preset high level into an enable signal at the preset low level when the input end and output end of the third switch transistor T4 are switched off and the input end and output end of the fourth switch transistor T5 are switched on.

It should be noted that the CMOS reverse unit 41 adopts a top-P and bottom-N CMOS structure. A COMS has minimal static power consumption and a very small threshold voltage range, and is close to an ideal switch. Moreover, through the CMOS, a voltage provided by the first power supply is used to control the third switch transistor T4 and the fourth switch transistor T5, thereby avoiding the problem of insufficient trigger output thrust.

The third switch transistor T4 and the fourth switch transistor T5 in this embodiment of the present application include but are not limited to triodes, MOS transistors, and thin film transistors. Moreover, according to the content disclosed in the present application, it is easy for those skilled in the art to contemplate modifying, according to a specific selected type of a switch transistor, the CMOS reverse unit 41 disclosed in the present application into a CMOS reverse unit adapting to the selected type of the switch transistor. Therefore, the present application can be achieved by an NPN or PNP-type triode, an N-channel or P-channel switch MOS transistor, or an N-type or P-type thin film transistor. It is not limited in this embodiment of the present application.

In some implementations, the third switch transistor T4 is a P-type switch transistor, for example: a PNP triode, a P-channel MOS transistor, or a P-type thin film transistor.

In some implementations, the fourth switch transistor T5 is an N-type switch transistor, for example: an NPN triode, an N-channel MOS transistor, or an N-type thin film transistor.

In some implementations, in order to reduce interference, the pre-charging voltage of the light-emitting unit 100 is precisely controlled. The line scanning signal port and the input end of the triggering module 400 are further connected in series with a first diode D1. An anode of the first diode D1 is electrically connected to the line scanning signal port and a cathode of the first diode D1 is electrically connected to the input end of the triggering module 400.

The first diode 41 is configured to rectify the line scanning signal input to the triggering module. By the rectification of the line scanning signal through the first diode 41, clutters in the line scanning signal are filtered off, so that the triggering module 400 can receive accurate triggering signals to avoid false triggering.

Figure 6:
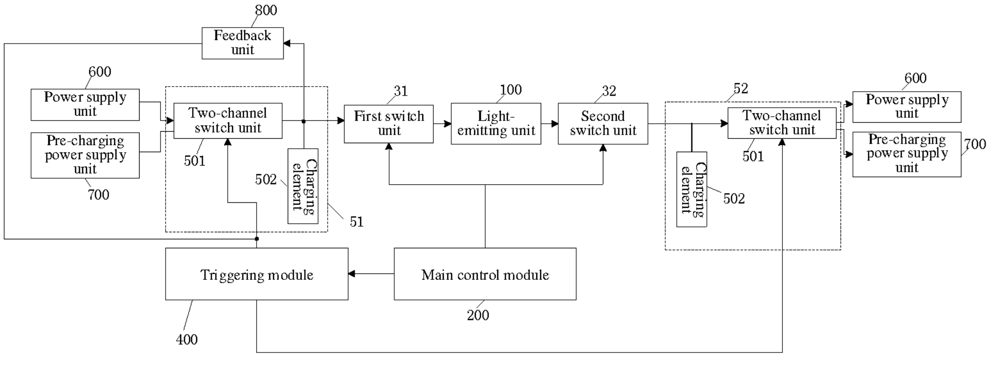
FIG. 6 is a logical block diagram II of a drive circuit of a pixel unit according to a preferred embodiment of the present application.

FIG. 6 is a logical block diagram II of a drive circuit of a pixel unit according to a preferred embodiment of the present application. In order to achieve a stable voltage after pre-charging, in some implementations, referring to FIG. 6 and FIG. 7, the drive circuit further includes a feedback unit 800. A detection end of the feedback unit 800 is electrically connected to electrical connection points (refer to the electrical connection points between the capacitor C1 and the switch transistor T1, the switch transistor T7, and the switch transistor T12 in FIG. 7) between the charging elements 502 and the switch module 300, and an output end (refer to an electrical connection point between the first diode D1 and the inverter U4 in FIG. 7) of the feedback unit 800 is electrically connected to the input end of the triggering module 400.

The feedback unit 800 is configured to detect whether the pre-charging voltage generated by the pre-charging of the charging elements 502 (correspondingly detecting a voltage of C1 in FIG. 7) is less than a preset threshold, and feed back a corresponding feedback signal to the triggering module 400.

The triggering module 400 is configured to generate a pre-charging disconnection triggering signal when the feedback signal indicates that the pre-charging voltage is not less than the preset threshold.

The two-channel switch units 501 are configured to control, according to the pre-charging disconnection triggering signal output by the triggering module 400, the pre-charging power supply unit 700 to be disconnected from the switch module 300.

In this embodiment, when the pre-charging power supply unit 700 is disconnected from the switch module 300, it indicates that the pre-charging is ended, and a voltage after pre-charging is stabilized through the corresponding charging elements 502.

The charging elements 502 are configured to stop the pre-charging when the feedback signal indicates that the pre-charging voltage is not less than the preset threshold.

In some implementations, the feedback unit 800 includes a voltage comparator U3. A forward input end of the voltage comparator U3 is electrically connected to a second power supply V2, and a backward input end of the voltage comparator U1 is connected to the detection end of the feedback unit 800. An output end of the voltage comparator U3 is abutted with the output end of the feedback unit 800. The voltage comparator U3 is configured to compare the pre-charging voltage with a voltage corresponding to the second power supply V2 and output the corresponding feedback signal.

It should be noted that in this embodiment, when the pre-charging voltage Va reaches the preset threshold, and a low level is output through the voltage comparator U3, a falling edge is output by the triggering module 400. This falling edge is a second falling edge after the triggering module 400 triggers the pre-charging module 500 for pre-charging. Since the level of the first setting port of the first trigger U1 is high, an output of the second state output port of the second trigger U2 is at a low level. After the low level is reversed by the CMOS reverse unit 41, a high level is output. The two-channel switch unit 501 disconnects the pre-charging power supply unit 700 from the switch module 300, and at the same time, the pre-charging voltage Vb corresponding to the second pre-charging unit 52 is also cut off. This achieves the maintenance and stabilization of the pre-charging voltage, increasing the response speed when the light-emitting unit 100 emits light. At the same time, isolation protection has been achieved on the light-emitting unit 100.

An embodiment of the present application also provides a pixel unit, including a light-emitting unit and a drive circuit for driving the light-emitting unit to emit light. The drive circuit includes the drive circuit of the pixel unit in the aforementioned embodiment.

An embodiment of the present application also provides a display panel, including a plurality of pixel units. Each pixel unit includes a light-emitting unit and a drive circuit for driving the light-emitting unit. The drive circuit is the drive circuit in the aforementioned embodiment.

It should be noted that in this context, relational terms such as "first" and "second" are used merely to distinguish one entity or operation from another entity or operation, instead of necessarily requiring or implying that these entities or operations have any of these actual relationships or orders. Furthermore, terms "include", "including" or any other variants are intended to cover non-exclusive inclusions, so that a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

The above is only the specific implementation of the present application, so that those skilled in the art can understand or implement the present application. Various modifications to these embodiments will be apparent to those skilled in the art, and the general principles defined herein can be implemented in other embodiments without departing from the spirit or scope of the present application. Therefore, the present application will not be limited to these embodiments shown in this text, but should conform to the widest scope consistent with the principles and novel features disclosed herein.

What is claimed is:

1. A drive circuit of a pixel unit, used for driving a light-emitting unit of the pixel unit, wherein the drive circuit comprises a main control module, a switch module, a triggering module, a pre-charging module, a power supply unit, and a pre-charging power supply unit; the main control module is electrically connected to the switch module and the triggering module respectively, and transmits a line scanning signal to the switch module and the triggering module; the switch module is also electrically connected to the light-emitting unit and the pre-charging module respectively; the triggering module is also electrically connected to the pre-charging module; the pre-charging module is also electrically connected to the power supply unit and the pre-charging power supply unit respectively;

the switch module is configured to control connection and disconnection between the light-emitting unit and the pre-charging module on the basis of the received line scanning signal;

the triggering module is configured to control connection and disconnection between the power supply unit and the pre-charging module, as well as connection and disconnection between the pre-charging power supply unit and the pre-charging module, on the basis of the received line scanning signal when the light-emitting unit and the pre-charging module are disconnected; and the light-emitting unit is configured to perform, when the light-emitting unit and the pre-charging module are connected, luminescence display under control of a power supply voltage transmitted by the power supply unit through the pre-charging module, and perform luminescence display under control of a pre-charging voltage generated when the pre-charging module is connected to the pre-charging power supply unit;

wherein the pre-charging module comprises a first pre-charging unit and a second pre-charging unit; the first pre-charging unit and the second pre-charging unit each comprise a two-channel switch unit and a charging element; a first input end of the two-channel switch unit corresponding to the first pre-charging unit is electrically connected to a positive power port of the power supply unit, and a second input end of the two-channel switch unit corresponding to the first pre-charging unit is electrically connected to a first port of the pre-charging power supply unit; a first input end of the two-channel switch unit corresponding to the second pre-charging unit is electrically connected to a negative power port of the power supply unit, and a second input end of the two-channel switch unit corresponding to the second pre-charging unit is electrically connected to a second port of the pre-charging power supply unit; a first controlled end and a second controlled end of each two-channel switch unit are electrically connected to an output end of the triggering module; a first output end and a second output end of each two-channel switch unit are electrically connected to one end of the switch module and the corresponding charging element, and the other end of the corresponding charging element is grounded;

the triggering module is configured to generate, when the light-emitting unit and the pre-charging module are disconnected on the basis of the line scanning signal received by the triggering module, a triggering signal controlling the two-channel switch units;

the two-channel switch units are configured to control, on the basis of the triggering signal output by the triggering module, the switch module to be connected to one of the power supply unit and the pre-charging power supply unit;

the charging elements are configured to perform pre-charging on the basis of the pre-charging voltage provided by the pre-charging power supply unit; and the pre-charging module is configured to control the charging element for pre-charging when the switch module is connected to the pre-charging power supply unit and when the switch module disconnects the pre-charging module from the light-emitting unit, and control the power supply unit to be connected to the light-emitting unit when the switch module connects the pre-charging module to the light-emitting unit.

2. The drive circuit according to claim 1, wherein each two-channel switch unit comprises a first switch transistor and a second switch transistor; an input end of the first switch transistor is abutted with the first input end; an input end of the second switch transistor is abutted with the second input end; a control end of the first switch transistor is abutted with the first controlled end; a control end of the second switch transistor is abutted with the second controlled end; an output end of the first switch transistor is abutted with the first output end; an output end of the second switch transistor is abutted with the second output end;

the first switch transistor is configured to control, when a level of the triggering signal received by the control end of the first switch transistor is a preset low level, the input end and output end of the first switch transistor to be switched on, and control, when a level of the triggering signal received by the control end of the first switch transistor is a preset high level, the input end and output end of the first switch transistor to be switched off;

the second switch transistor is configured to control, when a level of the triggering signal received by the control end of the first switch transistor is a preset low level, the input end and output end of the second switch transistor to be switched off, and control, when a level of the triggering signal received by the control end of the first switch transistor is a preset high level, the input end and output end of the second switch transistor to be switched on; and the two-channel switch units are configured to control, when the input end and output end of the first switch transistor are switched on and the input end and output end of the second switch transistor are switched off, the pre-charging power supply unit to be connected to the switch module, and control, when the input end and output end of the first switch transistor are switched off and the input end and output end of the second switch transistor are switched on, the power supply unit to be connected to the switch module.

3. The drive circuit according to claim 1, wherein the switch module comprises a first switch unit and a second switch unit; the first switch unit comprises a third input end, a third output end, and a third control end; the second switch unit comprises a fourth input end, a fourth output end, and a fourth control end; the third input end is electrically connected to the first output end and the second output end of the two-channel switch unit of the first pre-charging unit; the third output end is electrically connected to a first end of the light-emitting unit; the third control end is electrically connected to a line scanning signal port of the main control module; the fourth input end is electrically connected to a second end of the light-emitting unit; the fourth output end is electrically connected to the first output end and the second output end of the two-channel switch unit of the second pre-charging unit; the fourth control end is electrically connected to the line scanning signal port of the main control module;

the first switch unit is configured to control on and off of the third input end and the third output end on the basis of the line scanning signal received by the third control end;

the second switch unit is configured to control on and off of the fourth input end and the fourth output end on the basis of the line scanning signal received by the fourth control end;

the switch module is configured to control, when the third input end and the third output end are switched on and the fourth input end and the fourth output end are switched on, the light-emitting unit and the pre-charging module to be connected, and control, when the third input end and the third output end are switched off and the fourth input end and the fourth output end are switched off, the light-emitting unit and the pre-charging module to be disconnected.

4. The drive circuit according to claim 3, wherein the first switch unit comprises a first controlled switch and a second controlled switch; the second switch unit comprises a third controlled switch; a controlled end of the first controlled switch is abutted with the third control end; an input end of the first controlled switch is electrically connected to a first data port of the main control module; an output end of the first controlled switch is electrically connected to a controlled end of the second controlled switch; an input end of the second controlled switch is abutted with the third input end; an output end of the second controlled switch is abutted with the third output end; a controlled end of the third controlled switch is abutted with the fourth control end; an input end of the third controlled switch is abutted with the fourth input end; an output end of the third controlled switch is abutted with the fourth output end;

the first controlled switch is configured to control on and off of the input end and the output end of the first controlled switch according to the line scanning signal received by the controlled end of the first controlled switch;

the second controlled switch is configured to control, when the input end and the output end of the first controlled switch are switched on, the input end and the output end of the second controlled switch to be switched on, and control, when the input end and the output end of the first controlled switch are switched off, the input end and the output end of the second controlled switch to be switched off; and the third controlled switch is configured to control on and off of the input end and the output end of the third controlled switch according to the line scanning signal received by the controlled end of the third controlled switch.

5. The drive circuit according to claim 3, wherein the triggering module comprises a first trigger, a second trigger, an inverter, and a Complementary Metal-Oxide-Semiconductor Transistor (CMOS) reverse unit; the first trigger comprises a first setting port, a first resetting port, and a first state output port; the second trigger comprises a second setting port, a second resetting port, and a second state output port; the first resetting port is abutted with an input end of the triggering module and is electrically connected to the line scanning signal port; the first resetting port is also electrically connected to the second resetting port through the inverter; the first state output port is electrically connected to the second setting port; the second state output port is electrically connected to an input end of a CMOS reverse unit and is electrically connected to the first setting port through the inverter; an output end of the CMOS reverse unit is abutted with an output end of the triggering module;

the first trigger is configured to output, when a level of the line scanning signal received by the first resetting port is changed into a preset low level, the level at the first setting port before change of the level of the line scanning signal as a first state signal along the first state output port, and output, when the level of the line scanning signal received by the first resetting port is changed into a preset high level, the level at the first setting port as a first state signal along the first state output port;

the second trigger is configured to output, when a level of the line scanning signal received by the second resetting port is changed into a preset low level, the first state signal received by the second setting port before change of the level of the line scanning signal as a second state signal along the second state output port, and output, when the level of the line scanning signal received by the second resetting port is changed into a preset high level, the first state signal received by the second setting port as a second state signal along the second state output port; and the CMOS reverse unit is configured to reverse the second state signal to generate an enable signal controlling on and off of a circuit between the power supply unit and the pre-charging module, as well as an enable signal controlling on and off of a circuit between the pre-charging power supply unit and the pre-charging module.

6. The drive circuit according to claim 5, wherein the first trigger and the second trigger each comprise a falling edge trigger; the CMOS reverse unit comprises a third switch transistor and a fourth switch transistor; controlled ends of the third switch transistor and the fourth switch transistor are connected to the second state output port; and an input end of the third switch transistor is electrically connected to a first power supply; an output end of the third switch transistor is electrically connected to an input end of the fourth switch transistor and the output end of the triggering module respectively; an output end of the fourth switch transistor is grounded;

the third switch transistor is configured to control, when the second state signal received by the controlled end of the third switch transistor is at a preset low level, the input end and output end of the third switch transistor to be switched on, and control, when the second state signal received by the controlled end of the third switch transistor is at a preset high level, the input end and output end of the third switch transistor to be switched off;

the fourth switch transistor is configured to control, when the second state signal received by the controlled end of the fourth switch transistor is at a preset low level, the input end and output end of the fourth switch transistor to be switched off, and control, when the second state signal received by the controlled end of the fourth switch transistor is at a preset high level, the input end and output end of the third switch transistor to be switched on; and the CMOS reverse unit is configured to convert the second state signal at the preset low level into an enable signal at the preset high level when the input end and output end of the third switch transistor are switched on and the input end and output end of the fourth switch transistor are switched off, and convert the second state signal at the preset high level into an enable signal at the preset low level when the input end and output end of the third switch transistor are switched off and the input end and output end of the fourth switch transistor are switched on.

7. The drive circuit according to claim 5, wherein the line scanning signal port and the input end of the triggering module are further connected in series with a first diode; an anode of the first diode is electrically connected to the line scanning signal port; a cathode of the first diode is electrically connected to the input end of the triggering module; and the first diode is configured to rectify the line scanning signal input to the triggering module.

8. The drive circuit according to claim 1, wherein the drive circuit further comprises a feedback unit; a detection end of the feedback unit is electrically connected to electrical connection points between the charging elements and the switch module, and an output end of the feedback unit is electrically connected to the input end of the triggering module;

the feedback unit is configured to detect whether the pre-charging voltage generated by the pre-charging of the charging elements is less than a preset threshold, and feed back a corresponding feedback signal to the triggering module;

the triggering module is configured to generate a pre-charging disconnection triggering signal when the feedback signal indicates that the pre-charging voltage is not less than the preset threshold;

the two-channel switch units are configured to control, according to the pre-charging disconnection triggering signal output by the triggering module, the pre-charging power supply unit to be disconnected from the switch module; and the charging elements are configured to stop the pre-charging when the feedback signal indicates that the pre-charging voltage is not less than the preset threshold.

9. The drive circuit according to claim 8, wherein the feedback unit comprises a voltage comparator; a forward input end of the voltage comparator is electrically connected to a second power supply, and a backward input end of the voltage comparator is connected to the detection end of the feedback unit; an output end of the voltage comparator is abutted with the output end of the feedback unit; and the voltage comparator is configured to compare the pre-charging voltage with a voltage corresponding to the second power supply and output the corresponding feedback signal.

10. A display panel, comprising a plurality of pixel units, wherein each pixel unit comprises a light-emitting unit and a drive circuit for driving the light-emitting unit; the drive circuit comprises a main control module, a switch module, a triggering module, a pre-charging module, a power supply unit, and a pre-charging power supply unit; the main control module is electrically connected to the switch module and the triggering module respectively, and transmits a line scanning signal to the switch module and the triggering module; the switch module is also electrically connected to the light-emitting unit and the pre-charging module respectively; the triggering module is also electrically connected to the pre-charging module; the pre-charging module is also electrically connected to the power supply unit and the pre-charging power supply unit respectively;

the switch module is configured to control connection and disconnection between the light-emitting unit and the pre-charging module on the basis of the received line scanning signal;

the triggering module is configured to control connection and disconnection between the power supply unit and the pre-charging module, as well as connection and disconnection between the pre-charging power supply unit and the pre-charging module, on the basis of the received line scanning signal when the light-emitting unit and the pre-charging module are disconnected; and the light-emitting unit is configured to perform, when the light-emitting unit and the pre-charging module are connected, luminescence display under control of a power supply voltage transmitted by the power supply unit through the pre-charging module, and perform luminescence display under control of a pre-charging voltage generated when the pre-charging module is connected to the pre-charging power supply unit;

wherein the pre-charging module comprises a first pre-charging unit and a second pre-charging unit; the first pre-charging unit and the second pre-charging unit each comprise a two-channel switch unit and a charging element; a first input end of the two-channel switch unit corresponding to the first pre-charging unit is electrically connected to a positive power port of the power supply unit, and a second input end of the two-channel switch unit corresponding to the first pre-charging unit is electrically connected to a first port of the pre-charging power supply unit; a first input end of the two-channel switch unit corresponding to the second pre-charging unit is electrically connected to a negative power port of the power supply unit, and a second input end of the two-channel switch unit corresponding to the second pre-charging unit is electrically connected to a second port of the pre-charging power supply unit; a first controlled end and a second controlled end of each two-channel switch unit are electrically connected to an output end of the triggering module; a first output end and a second output end of each two-channel switch unit are electrically connected to one end of the switch module and the corresponding charging element, and the other end of the corresponding charging element is grounded;

the triggering module is configured to generate, when the light-emitting unit and the pre-charging module are disconnected on the basis of the line scanning signal received by the triggering module, a triggering signal controlling the two-channel switch units;

the two-channel switch units are configured to control, on the basis of the triggering signal output by the triggering module, the switch module to be connected to one of the power supply unit and the pre-charging power supply unit;

the charging elements are configured to perform pre-charging on the basis of the pre-charging voltage provided by the pre-charging power supply unit; and the pre-charging module is configured to control the charging element for pre-charging when the switch module is connected to the pre-charging power supply unit and when the switch module disconnects the pre-charging module from the light-emitting unit, and control the power supply unit to be connected to the light-emitting unit when the switch module connects the pre-charging module to the light-emitting unit.

11. The display panel according to claim 10, wherein each two-channel switch unit comprises a first switch transistor and a second switch transistor; an input end of the first switch transistor is abutted with the first input end; an input end of the second switch transistor is abutted with the second input end; a control end of the first switch transistor is abutted with the first controlled end; a control end of the second switch transistor is abutted with the second controlled end; an output end of the first switch transistor is abutted with the first output end; an output end of the second switch transistor is abutted with the second output end;

the first switch transistor is configured to control, when a level of the triggering signal received by the control end of the first switch transistor is a preset low level, the input end and output end of the first switch transistor to be switched on, and control, when a level of the triggering signal received by the control end of the first switch transistor is a preset high level, the input end and output end of the first switch transistor to be switched off;

the second switch transistor is configured to control, when a level of the triggering signal received by the control end of the first switch transistor is a preset low level, the input end and output end of the second switch transistor to be switched off, and control, when a level of the triggering signal received by the control end of the first switch transistor is a preset high level, the input end and output end of the second switch transistor to be switched on; and the two-channel switch units are configured to control, when the input end and output end of the first switch transistor are switched on and the input end and output end of the second switch transistor are switched off, the pre-charging power supply unit to be connected to the switch module, and control, when the input end and output end of the first switch transistor are switched off and the input end and output end of the second switch transistor are switched on, the power supply unit to be connected to the switch module.

12. The display panel according to claim 10, wherein the switch module comprises a first switch unit and a second switch unit; the first switch unit comprises a third input end, a third output end, and a third control end; the second switch unit comprises a fourth input end, a fourth output end, and a fourth control end; the third input end is electrically connected to the first output end and the second output end of the two-channel switch unit of the first pre-charging unit; the third output end is electrically connected to a first end of the light-emitting unit; the third control end is electrically connected to a line scanning signal port of the main control module; the fourth input end is electrically connected to a second end of the light-emitting unit; the fourth output end is electrically connected to the first output end and the second output end of the two-channel switch unit of the second pre-charging unit; the fourth control end is electrically connected to the line scanning signal port of the main control module;

the first switch unit is configured to control on and off of the third input end and the third output end on the basis of the line scanning signal received by the third control end;

the second switch unit is configured to control on and off of the fourth input end and the fourth output end on the basis of the line scanning signal received by the fourth control end;

the switch module is configured to control, when the third input end and the third output end are switched on and the fourth input end and the fourth output end are switched on, the light-emitting unit and the pre-charging module to be connected, and control, when the third input end and the third output end are switched off and the fourth input end and the fourth output end are switched off, the light-emitting unit and the pre-charging module to be disconnected.

13. The display panel according to claim 12, wherein the first switch unit comprises a first controlled switch and a second controlled switch; the second switch unit comprises a third controlled switch; a controlled end of the first controlled switch is abutted with the third control end; an input end of the first controlled switch is electrically connected to a first data port of the main control module; an output end of the first controlled switch is electrically connected to a controlled end of the second controlled switch; an input end of the second controlled switch is abutted with the third input end; an output end of the second controlled switch is abutted with the third output end; a controlled end of the third controlled switch is abutted with the fourth control end; an input end of the third controlled switch is abutted with the fourth input end; an output end of the third controlled switch is abutted with the fourth output end;

the first controlled switch is configured to control on and off of the input end and the output end of the first controlled switch according to the line scanning signal received by the controlled end of the first controlled switch;

the second controlled switch is configured to control, when the input end and the output end of the first controlled switch are switched on, the input end and the output end of the second controlled switch to be switched on, and control, when the input end and the output end of the first controlled switch are switched off, the input end and the output end of the second controlled switch to be switched off; and the third controlled switch is configured to control on and off of the input end and the output end of the third controlled switch according to the line scanning signal received by the controlled end of the third controlled switch.

14. The display panel according to claim 12, wherein the triggering module comprises a first trigger, a second trigger, an inverter, and a Complementary Metal-Oxide-Semiconductor Transistor (CMOS) reverse unit; the first trigger comprises a first setting port, a first resetting port, and a first state output port; the second trigger comprises a second setting port, a second resetting port, and a second state output port; the first resetting port is abutted with an input end of the triggering module and is electrically connected to the line scanning signal port; the first resetting port is also electrically connected to the second resetting port through the inverter; the first state output port is electrically connected to the second setting port; the second state output port is electrically connected to an input end of the CMOS reverse unit and is electrically connected to the first setting port through the inverter; an output end of the CMOS reverse unit is abutted with an output end of the triggering module;

the first trigger is configured to output, when a level of the line scanning signal received by the first resetting port is changed into a preset low level, the level at the first setting port before change of the level of the line scanning signal as a first state signal along the first state output port, and output, when the level of the line scanning signal received by the first resetting port is changed into a preset high level, the level at the first setting port as a first state signal along the first state output port;

the second trigger is configured to output, when a level of the line scanning signal received by the first resetting port is changed into a preset low level, the first state signal received by the second setting port before change of the level of the line scanning signal as a second state signal along the second state output port, and output, when the level of the line scanning signal received by the second resetting port is changed into a preset high level, the first state signal received by the second setting port as a second state signal along the second state output port; and the CMOS reverse unit is configured to reverse the second state signal to generate an enable signal controlling on and off of a circuit between the power supply unit and the pre-charging module, as well as an enable signal controlling on and off of a circuit between the pre-charging power supply unit and the pre-charging module.

15. The display panel according to claim 14, wherein the first trigger and the second trigger each comprise a falling edge trigger; the CMOS reverse unit comprises a third switch transistor and a fourth switch transistor; controlled ends of the third switch transistor and the fourth switch transistor are connected to the second state output port; and input end of the third switch transistor is electrically connected to a first power supply; an output end of the third switch transistor is electrically connected to an input end of the fourth switch transistor and the output end of the triggering module respectively; an output end of the fourth switch transistor is grounded;

the third switch transistor is configured to control, when the second state signal received by the controlled end of the third switch transistor is at a preset low level, the input end and output end of the third switch transistor to be switched on, and control, when the second state signal received by the controlled end of the third switch transistor is at a preset high level, the input end and output end of the third switch transistor to be switched off;

the fourth switch transistor is configured to control, when the second state signal received by the controlled end of the fourth switch transistor is at a preset low level, the input end and output end of the fourth switch transistor to be switched off, and control, when the second state signal received by the controlled end of the fourth switch transistor is at a preset high level, the input end and output end of the third switch transistor to be switched on; and the CMOS reverse unit is configured to convert the second state signal at the preset low level into an enable signal at the preset high level when the input end and output end of the third switch transistor are switched on and the input end and output end of the fourth switch transistor are switched off, and convert the second state signal at the preset high level into an enable signal at the preset low level when the input end and output end of the third switch transistor are switched off and the input end and output end of the fourth switch transistor are switched on.

16. The display panel according to claim 12, wherein the line scanning signal port and the input end of the triggering module are further connected in series with a first diode; an anode of the first diode is electrically connected to the line scanning signal port; a cathode of the first diode is electrically connected to the input end of the triggering module; and the first diode is configured to rectify the line scanning signal input to the triggering module.

17. The display panel according to claim 10, wherein the drive circuit further comprises a feedback unit; a detection end of the feedback unit is electrically connected to electrical connection points between the charging elements and the switch module, and an output end of the feedback unit is electrically connected to the input end of the triggering module;

the feedback unit is configured to detect whether the pre-charging voltage generated by the pre-charging of the charging elements is less than a preset threshold, and feed back a corresponding feedback signal to the triggering module;

the triggering module is configured to generate a pre-charging disconnection triggering signal when the feedback signal indicates that the pre-charging voltage is not less than the preset threshold;

the two-channel switch units are configured to control, according to the pre-charging disconnection triggering signal output by the triggering module, the pre-charging power supply unit to be disconnected from the switch module; and the charging elements are configured to stop the pre-charging when the feedback signal indicates that the pre-charging voltage is not less than the preset threshold.

18. The display panel according to claim 17, wherein the feedback unit comprises a voltage comparator; a forward input end of the voltage comparator is electrically connected to a second power supply, and a backward input end of the voltage comparator is connected to the detection end of the feedback unit; an output end of the voltage comparator is abutted with the output end of the feedback unit; and the voltage comparator is configured to compare the pre-charging voltage with a voltage corresponding to the second power supply and output the corresponding feedback signal.

* * * * *